United States Patent
Dunkle

(10) Patent No.: US 9,688,135 B2
(45) Date of Patent: Jun. 27, 2017

(54) FUEL VAPOR TRANSFER SYSTEM

(71) Applicant: Stant USA Corp., Connersville, IN (US)

(72) Inventor: Gary L. Dunkle, Connersville, IN (US)

(73) Assignee: Stant USA Group, Connersville, IN (US)

( * ) Notice: Subject to any disclaimer, the term of this patent is extended or adjusted under 35 U.S.C. 154(b) by 378 days.

(21) Appl. No.: 14/266,988

(22) Filed: May 1, 2014

(65) Prior Publication Data
US 2014/0326742 A1 Nov. 6, 2014

Related U.S. Application Data

(60) Provisional application No. 61/818,273, filed on May 1, 2013.

(51) Int. Cl.
B60K 15/035 (2006.01)

(52) U.S. Cl.
CPC .. B60K 15/03504 (2013.01); B60K 15/03519 (2013.01); B60K 2015/03514 (2013.01); B60Y 2200/12 (2013.01)

(58) Field of Classification Search
CPC ........ B60K 15/03504; B60K 15/03519; B60K 2015/03514; B60Y 2200/12
USPC ............. 141/95; 220/746, 749, 86.2
See application file for complete search history.

(56) References Cited

U.S. PATENT DOCUMENTS

| 4,498,493 A | 2/1985 | Harris |
|---|---|---|
| 4,676,390 A | 6/1987 | Harris |
| 4,685,584 A | 8/1987 | Harris |
| 4,716,920 A | 1/1988 | Crute |
| 4,736,863 A | 4/1988 | Harris |
| 4,779,755 A | 10/1988 | Harris |
| 4,787,529 A | 11/1988 | Harris |
| 4,877,146 A * | 10/1989 | Harris ............ B60K 15/04 141/286 |
| 4,887,733 A | 12/1989 | Harris |
| 4,913,303 A | 4/1990 | Harris |
| 5,108,001 A | 4/1992 | Harris |
| 5,183,173 A | 2/1993 | Heckman |
| 6,026,848 A | 2/2000 | Huynh |
| 6,481,592 B2 | 11/2002 | Harris |
| 6,561,211 B2 | 5/2003 | Devall |
| 7,654,403 B2 | 2/2010 | DeCapua et al. |
| 8,567,628 B2 | 10/2013 | Dunkle et al. |
| 2005/0155671 A1 | 7/2005 | McClung et al. |

(Continued)

FOREIGN PATENT DOCUMENTS

EP 1202906 B1 4/2006

OTHER PUBLICATIONS

PCT Search Report and Written Opinion established by the ISA/US on Aug. 25, 2014 and issued in connection with PCT/US2014/036293.

Primary Examiner — Allana Lewin Bidder
Assistant Examiner — James Hakomaki
(74) Attorney, Agent, or Firm — Barnes & Thornburg LLP

(57) ABSTRACT

A fuel cap includes a filler-neck closure adapted to mate with a filler neck to close a mouth opening into a fuel-conducting passageway formed in the filler neck. The filler-neck closure includes a vacuum-relief valve and a handle arranged to overlie the filler-neck closure and gripped by a user during removal of the fuel cap from the filler neck.

20 Claims, 8 Drawing Sheets

(56) References Cited

U.S. PATENT DOCUMENTS

2006/0151056 A1 7/2006 Dunkle
2010/0089919 A1 4/2010 Dunkle et al.

* cited by examiner

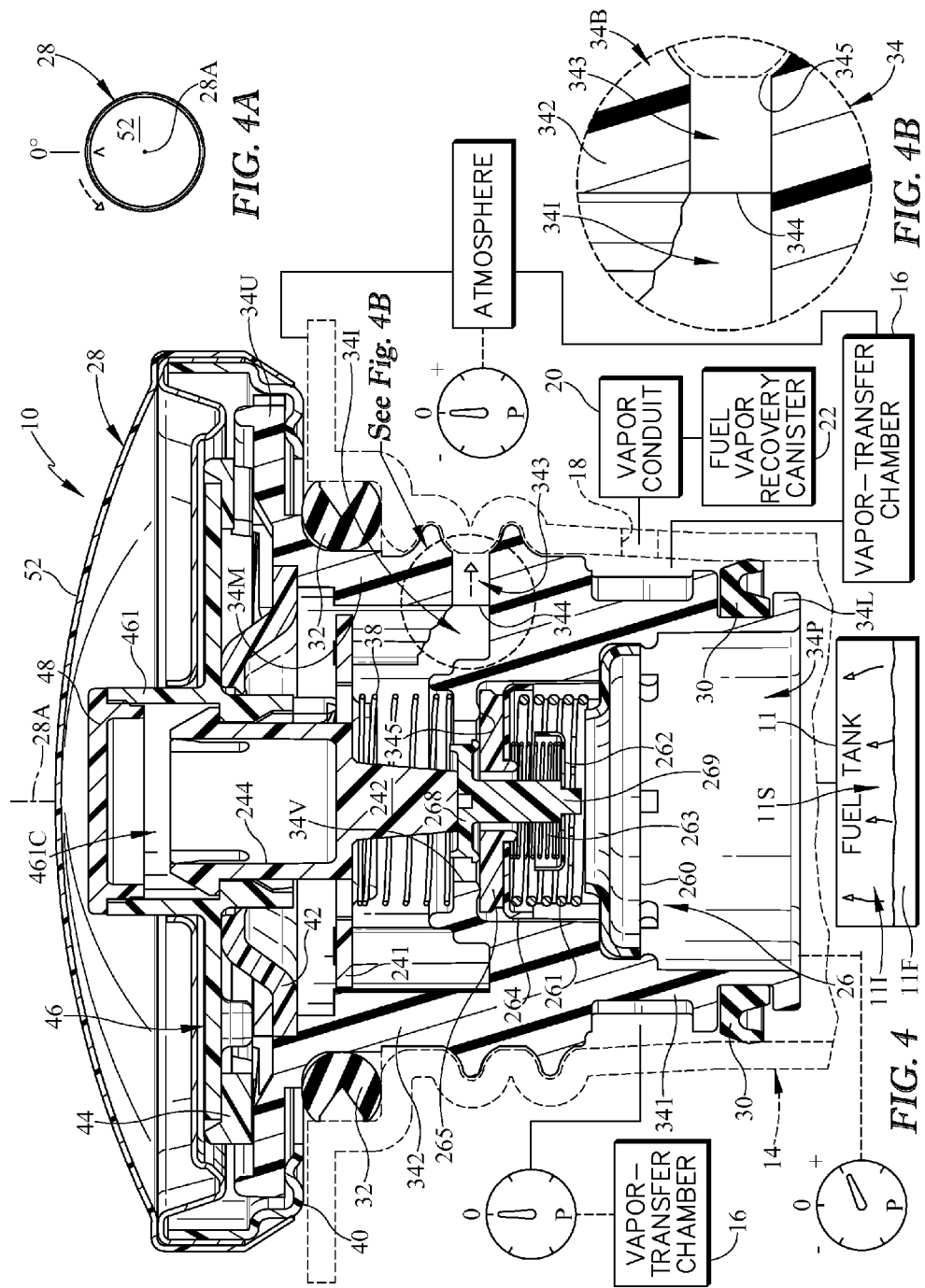

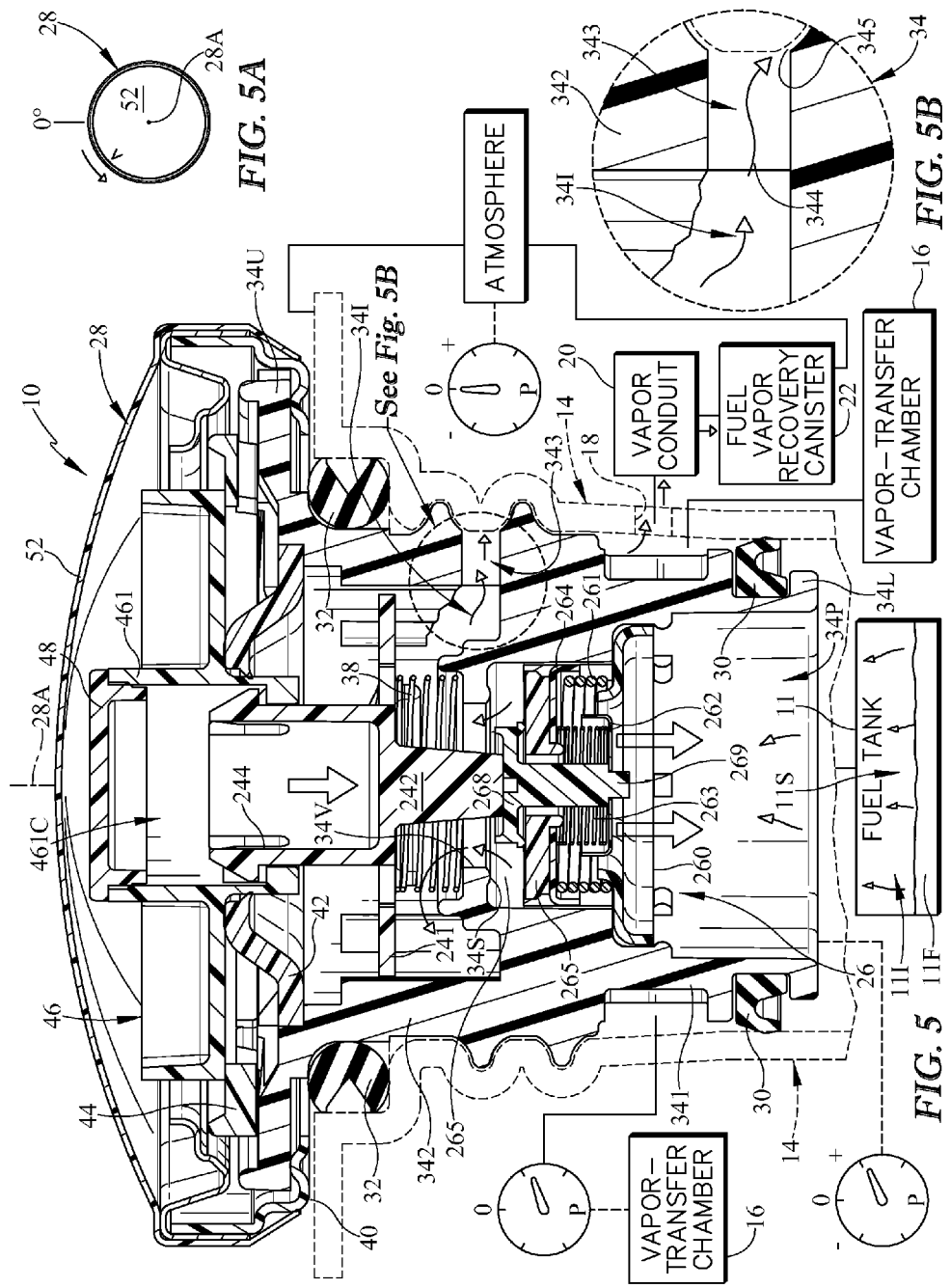

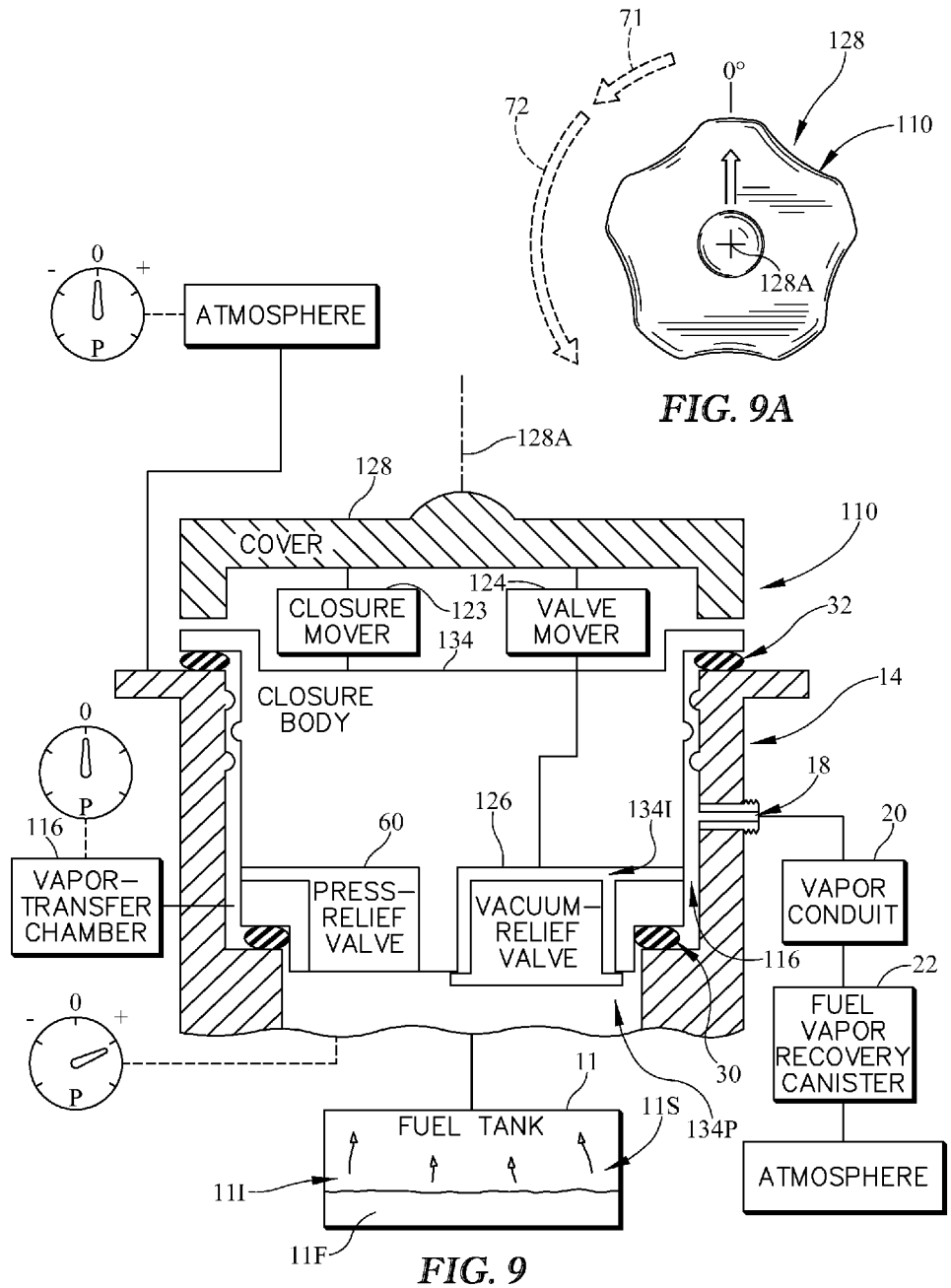

FUEL VAPOR TRANSFER SYSTEM

This application claims priority under 35 U.S.C. Section 119(e) to U.S. Provisional Application Ser. No. 61/818,273, filed May 1, 2013, which is expressly incorporated by reference herein.

BACKGROUND

The present disclosure relates to fuel systems, and particularly to systems for transferring fuel vapor discharged from a fuel tank. More particularly, the present disclosure relates to a fuel vapor transfer system for a vehicle fuel tank.

SUMMARY

A fuel vapor transfer system in accordance with the present disclosure includes a fuel cap having a filler-neck closure and a closure cover adapted to be gripped by a user. The filler-neck closure is adapted to engage and move relative to a fuel tank filler neck to close a mouth opening into a fuel-conducting passageway formed in the filler neck. In illustrative embodiments, a closure mover included in the fuel cap is coupled to the closure cover and to the filler-neck closure and is configured to transmit torque applied to the closure cover to the filler-neck closure to cause the filler-neck closure to turn in the fuel-conducting passageway formed in the filler neck during filler-neck closure installation in or removal from the fuel tank filler neck.

In illustrative embodiments, the filler-neck closure includes a closure body adapted to be moved into and out of the fuel-conducting passageway formed in the filler neck and to mate with the filler neck. The filler-neck closure also includes a vacuum-relief valve coupled to the closure body and configured normally to dissipate vacuum in a fuel tank coupled to the filler neck by admitting atmosphere into the filler neck and fuel tank. A valve mover included in the filler-neck closure driven by the closure mover operates to move the vacuum-relief valve to an opened position each time the fuel cap is removed from the filler neck by a vehicle operator to vent pressurized fuel vapor from the fuel tank through the filler neck and through the fuel cap.

In illustrative embodiments, the closure body is formed to include a vent aperture closed normally by the vacuum-relief valve and arranged to open into an interior chamber formed in the closure body. The vent aperture is formed to communicate with the fuel-conducting passageway of the filler neck when the fuel cap is coupled to the filler neck to close a mouth opening into the fuel-conducting passageway formed in the filler neck. When the vacuum-relief valve is moved relative to the closure body to an opened position automatically by the valve mover during cap removal, any high-pressure fuel vapor extant in the fuel tank and the filler neck can flow through the vent aperture and past the opened vacuum-relief valve and into the interior chamber formed in the closure body.

In illustrative embodiments, the closure body is also formed to include a vent channel having a channel inlet formed in an interior wall of the closure body to open into the interior chamber formed in the closure body to communicate with any vented high-pressure fuel vapor present therein. The vent channel also has a channel outlet formed in an exterior wall of the closure body to communicate with regions surrounding the closure body so that pressurized fuel vapor present in the interior chamber of the closure body can flow into and through the vent channel to exit the closure body through the channel outlet.

In illustrative embodiments, the fuel cap further includes a pair of O-ring seals that are mounted on the exterior wall of the closure body. The O-ring seals are arranged to engage the fuel-tank filler neck when the fuel cap is installed in the filler neck to create a sealed vapor-transfer chamber that is located in an annular space formed between the closure body and the fuel-tank filler neck to receive pressurized fuel vapor discharged from the vent channel through the channel outlet. The sealed vapor-transfer chamber created by the O-ring seals in cooperation with the closure body and filler neck is sealed off from the atmosphere around the fuel cap and filler neck but is connected by a vapor conduit to a fuel vapor recovery canister located away from the fuel-tank filler neck.

During removal of the fuel cap from the fuel-tank filler neck, the vacuum-relief valve is opened automatically by the valve mover. Pressurized fuel vapor flows from the fuel tank through the fuel-conducting passageway formed in the filler neck and then through the vent aperture, interior chamber, and vent channel formed in the closure body into the sealed vapor-transfer chamber. In accordance with the present disclosure, pressurized fuel vapor present in the sealed vapor-transfer chamber flows to the fuel vapor recover canister through the vapor conduit associated with the filler neck without discharging fuel vapor directly to the atmosphere through the mouth of the filler neck.

In illustrative embodiments, the valve mover is coupled to the closure cover via the closure mover to provide means for opening the vacuum-relief valve in response to rotation of the closure cover in a counterclockwise cap-removal direction by a user so that pressurized fuel vapor in the fuel tank filler neck is vented to the fuel vapor recovery canister, in sequence, through the interior chamber formed in the closure body, the sealed vapor-transfer chamber located between the fuel cap and the filler neck, and the vapor conduit associated with the filler neck prior to breaking a sealed connection established between the filler-neck closure and the fuel-tank filler neck.

In illustrative embodiments, the valve mover is configured to convert rotary movement of the closure cover into downward movement of the vacuum-relief valve relative to the closure body. Application of a downward force by the valve mover to the vacuum-relief valve causes the vacuum-relief valve to move downwardly in the vent aperture formed in the closure body from a normally closed position to an opened position and act to provide pressure relief to vent pressurized fuel vapor from the fuel tank through the closure body to the sealed vapor-transfer chamber and to the fuel vapor recovery canister via the vapor conduit during removal of the fuel cap from the filler neck but before separation of the filler-neck closure from the filler neck so that this vented pressurized fuel vapor flows to the fuel vapor recovery canister instead of directly to the atmosphere.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a motorcycle including a fuel cap made in accordance with the present disclosure and mounted on a fuel-tank filler neck that is coupled to a fuel tank of the motorcycle;

FIG. 2 is an enlarged perspective view of the fuel cap, the fuel-tank filler neck, and the fuel tank of FIG. 1 showing the fuel cap before it has been mounted on the fuel-tank filler neck and showing that the fuel cap includes a filler-neck closure having external threads configured to mate with the fuel-tank filler neck and suggesting diagrammatically that the filler-neck closure cooperates with the fuel-tank filler neck to form a sealed vapor-transfer chamber therebetween when the fuel cap is mounted on the fuel-tank filler neck and suggesting the fuel-tank filler neck is formed to include a vent port opening into the sealed vapor-transfer chamber to communicate pressurized fuel vapor from the sealed vapor-transfer chamber to a fuel vapor recovery canister through a vapor conduit without discharging that pressurized fuel vapor to the atmosphere during, for example, an early stage of a cap-removal activity that takes place during tank refueling as suggested in FIG. 5;

FIG. 3A is an exploded perspective assembly view of components included in the fuel cap shown in FIGS. 1 and 2 and showing the threaded closure body on the lower right side of the drawing and showing two of the four vent channels formed in the closure body and the interior chamber formed in the closure body;

FIG. 3B is an enlarged partial view of several components shown in FIG. 3A that cooperate to transfer pressurized fuel vapor extant in the fuel-conducting passageway formed in a fuel-tank filler neck to the sealed vapor-transfer chamber suggested in FIG. 2 during an early stage of removal of the fuel cap from the fuel-tank filler neck so that such pressurized fuel vapor is conducted through the filler-neck closure into the sealed vapor-transfer chamber for delivery to the fuel vapor recovery canister through the vent port formed in the fuel-tank filler neck and the vapor conduit interconnecting the vent port and the fuel vapor recovery canister;

FIG. 4 is an enlarged sectional view taken along line 4-4 of FIG. 1 showing the fuel cap mounted on the fuel-tank filler neck and showing a vacuum-relief valve included in the fuel cap in a normally closed position engaging an annular valve seat formed in a closure body of the filler-neck closure to surround a vent aperture formed in the closure body and showing that the filler-neck closure also includes an upper O-ring seal coupled to an exterior surface of the closure body and a lower O-ring seal coupled to the exterior surface of the closure body and arranged to lie in spaced-apart relation to the upper O-ring seal and showing that the closure body, upper and lower O-ring seals, and the fuel-tank filler neck cooperate to define a sealed vapor-transfer chamber therebetween when the fuel cap is mounted on the fuel-tank filler neck and also showing that the fuel-tank filler neck is formed to include a vent port opening into the sealed fuel-vapor transfer chamber and communicating with a fuel vapor recovery canister via a vapor conduit;

FIG. 4A is a top plan view of the fuel cap of FIG. 4 showing the position of the closure cover before it is rotated in a counterclockwise direction to begin to remove the fuel cap from the fuel-tank filler neck;

FIG. 4B is an enlarged view of the circled region of FIG. 4 showing that a side wall of the closure body is formed to include a vent channel having a channel inlet opening into the interior chamber formed in the closure body and a channel outlet opening into the sealed vapor-transfer chamber located outside the closure body when the fuel cap is mounted on the fuel-tank filler neck to place the sealed vapor-transfer chamber in fluid communication with the interior chamber;

FIG. 5 is a view similar to FIG. 4 showing that the vacuum-relief valve has been moved by a valve mover (in response to rotation of the closure cover) downwardly from the normally closed position shown in FIG. 4 to an opened position in response to rotation of the closure cover in a counterclockwise cap-removal direction during an early stage of a cap-removal activity so that pressurized fuel vapor discharged from a fuel tank into the fuel-conducting passageway formed in the fuel-tank filler neck can flow past the opened vacuum-relief valve into the interior chamber and then through the vent channel formed in the closure body into the sealed vapor-transfer chamber for delivery to the fuel vapor recovery canister via the vent port formed in the fuel-tank filler neck and the vapor conduit before the upper and lower O-ring seals included in the fuel cap disengage the fuel-tank filler neck so that most of the pressurized fuel vapor extant in the fuel tank is conducted to the fuel vapor recovery canister when the fuel cap is removed from the fuel-tank filler neck rather than being released into the atmosphere;

FIG. 5A is a top plan view of the fuel cap of FIG. 5 showing the position of the closure cover after it has been rotated in the counterclockwise cap-removal direction to cause the valve mover to move the vacuum-relief valve relative to the closure body downwardly from the normally closed position shown in FIG. 4 to the opened position shown in FIG. 5;

FIG. 5B is an enlarged view of the circled region of FIG. 5 showing flow of pressurized fuel vapor from the interior chamber formed in the closure body into the sealed vapor-transfer chamber located outside of the closure body through the vent channel formed in a side wall of the closure body;

Figure 6:
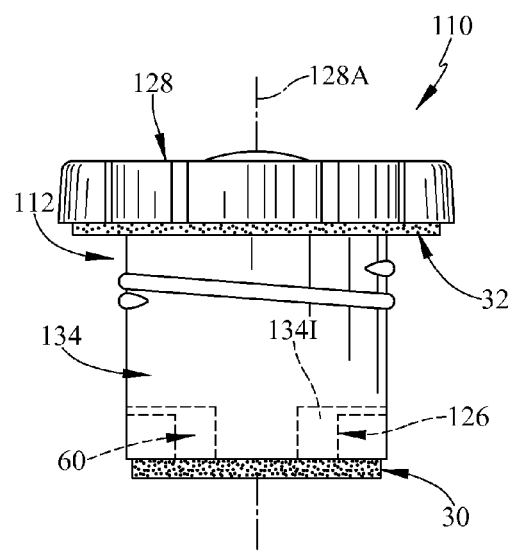
FIG. 6 is a side elevation view of a fuel cap in accordance with another illustrative embodiment of the present disclosure.
Figure 7:
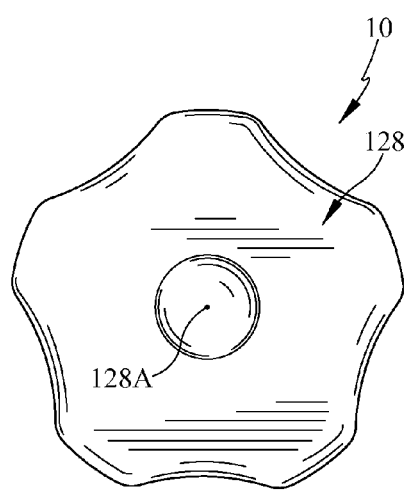
FIG. 7 is a top plan view of the fuel cap of FIG. 6.
Figure 8:
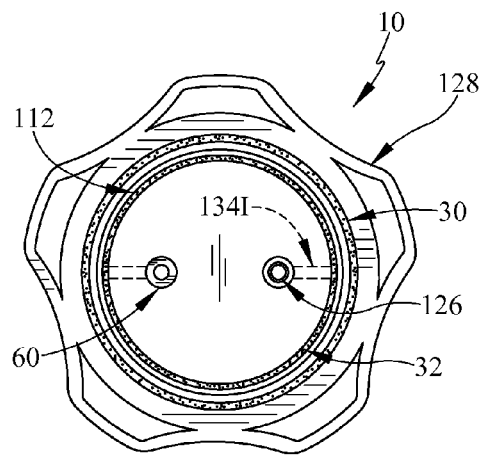
FIG. 8 is a bottom view of the fuel cap of FIG. 6.
Figure 10A:
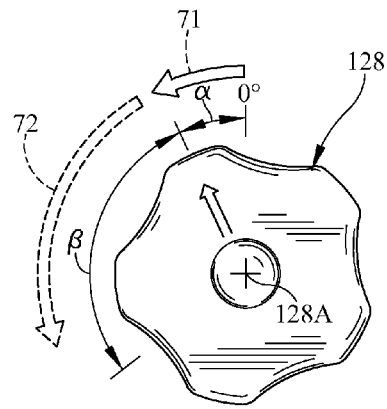
Figure 10:
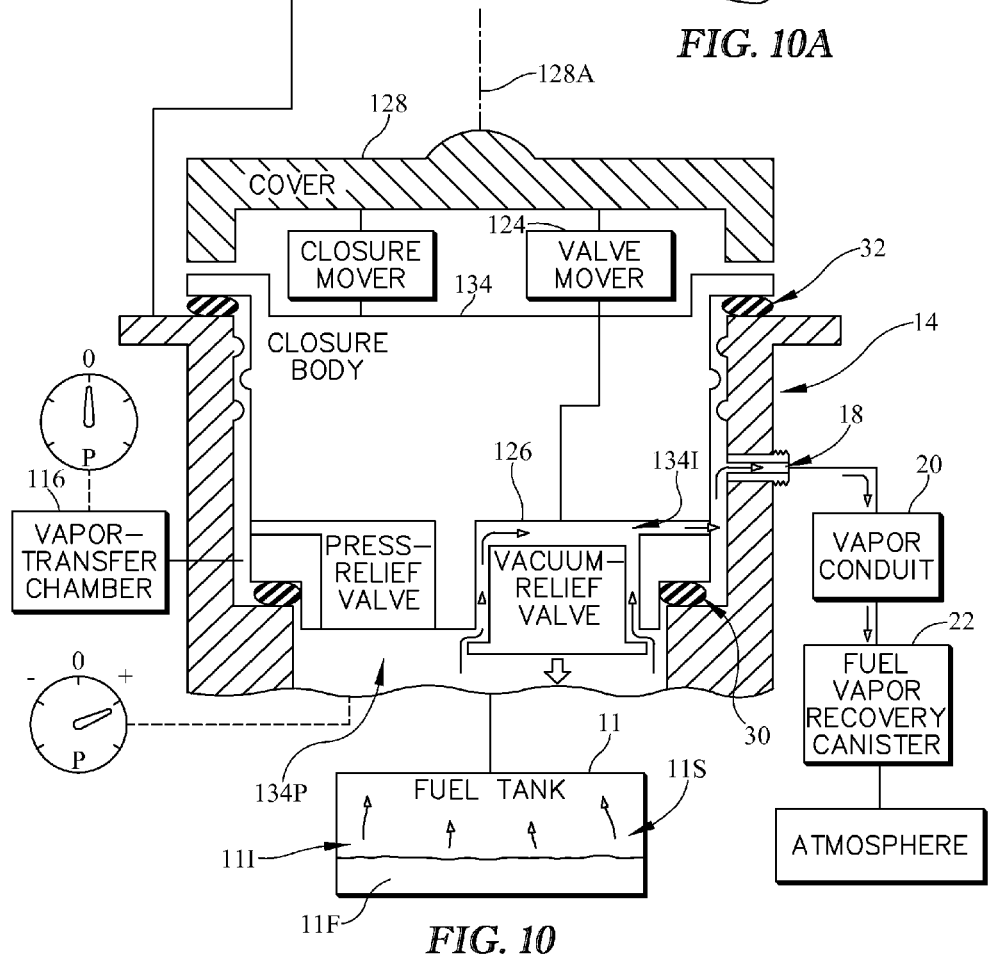

FIG. 9 is a partially diagrammatic view of the fuel cap of FIGS. 6-8 mated with a filler neck coupled to a fuel tank and showing that the illustrative fuel cap includes a closure cover, a filler-neck closure including a closure body adapted to be received in the filler neck and a movable vacuum-relief valve mounted in an interior chamber formed in the closure body to move between closed and opened positions normally to admit atmosphere into the filler neck when negative tank pressure exists in the fuel tank, a movable pressure-relief valve that is mounted in a passageway formed in the closure body to lie in side-by-side relation to the vacuum-relief valve and to move between closed and opened positions normally to vent unwanted excess pressure from the fuel tank, a valve mover coupled to the closure cover and the vacuum-relief valve and configured to move the vacuum-relief valve to the opened position to vent excess pressure from the fuel tank in response to rotation of the closure cover in a counterclockwise cap-removal direction during a first stage of rotation of the fuel cap relative to the fuel-tank filler neck even though no vacuum is extant in the fuel tank, a closure mover coupled to the closure cover and configured to move the closure body relative to the fuel-tank filler neck after the vacuum-relief valve has been moved to the opened position by the valve mover during a second stage of rotation of the closure cover relative to the fuel-tank filler neck in a counterclockwise cap-removal direction, and a pair of O-ring seals arranged on the closure body to engage the filler neck and define a sealed vapor-transfer chamber provided in an annular space located between the closure body and the filler neck;

FIG. 9A is a top plan view of the fuel cap of FIG. 9 installed on the filler neck to close the mouth of the filler neck that opens into a fuel-conducting passageway formed in the filler neck showing the closure cover in a first position corresponding to the fuel cap in a closed position on the filler neck as shown diagrammatically in FIG. 9 showing the closure cover prior to first and second stages of rotation relative to the fuel-tank filler neck;

FIG. 10 is a diagrammatic view similar to FIG. 9 showing the vacuum-relief valve after it has been moved to the opened position by the valve mover during the first stage rotation of the fuel cap relative to the fuel-tank filler neck in the counterclockwise cap-removal direction and showing that the pair of O-ring seals provide means for cooperating with the closure body and the filler neck to define and maintain the sealed vapor-transfer chamber between the closure body and the filler neck during the first stage of rotation of the closure cover relative to the filler neck so that the sealed vapor-transfer chamber (i) receives pressurized fuel vapor vented from the fuel tank and filler neck past the temporarily opened vacuum-relief valve as suggested by the pressure gauges coupled to the filler neck and the sealed vapor-transfer chamber and (ii) conducts the pressurized fuel vapor from the sealed vapor-transfer chamber into a vapor conduit extending from vent port formed in the filler neck as suggested by arrows arranged in the filler neck and the sealed vapor-transfer chamber before the mouth of the filler neck is reopened to the atmosphere after the second stage of rotation of the closure cover relative to the filler neck in a counterclockwise cap-removal direction; and FIG. 10A is a view similar to FIG. 9A showing the closure cover in a second position after rotation of the closure cover through an angle α during a first stage of rotation but before rotation of the closure cover through an angle β during a second stage of rotation in which the filler-neck closure is unmated from the filler neck.

DETAILED DESCRIPTION

Figure 1:
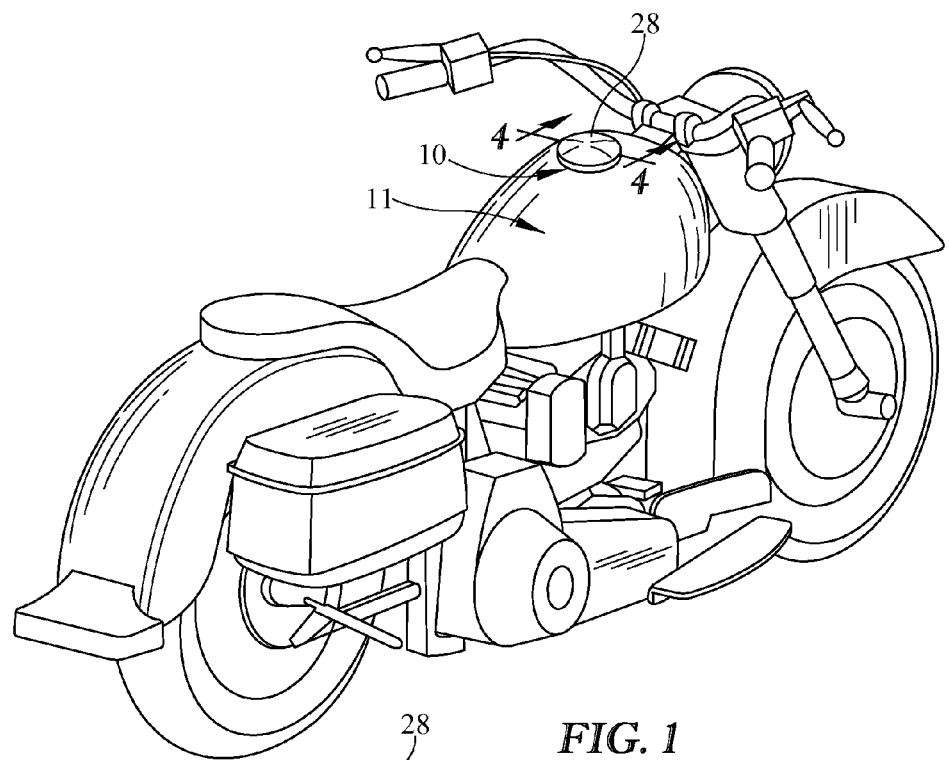
Figure 2:
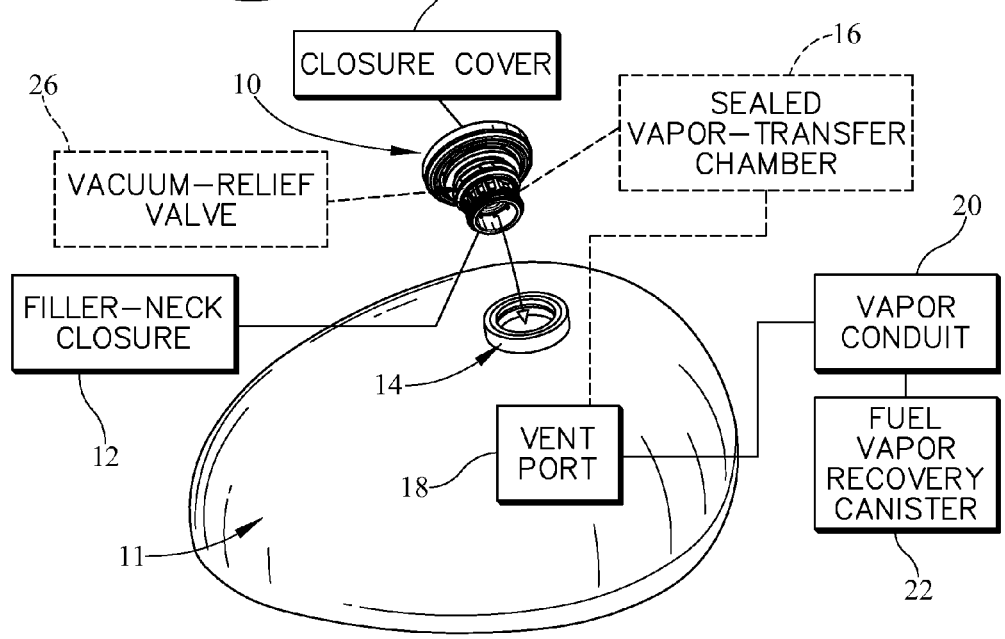

A fuel cap 10 in accordance with the present disclosure includes a filler-neck closure 12 configured to mate with a fuel-tank filler neck 14 associated with a fuel tank 11 to form a sealed vapor-transfer chamber 16 therebetween as suggested in FIGS. 1, 4, and 5. Filler neck 14 is formed to include a vent port 18 arranged to open into sealed vapor-transfer chamber 16 and coupled in fluid communication with a fuel vapor recovery canister 22 via a vapor conduit 20 as suggested in FIGS. 2, 4, and 5. A fuel cap 110 in accordance with another embodiment of the present disclosure is illustrated in FIGS. 6-10.

During an early stage of removal of fuel cap 10 from filler neck 14, a valve mover 24 included in fuel cap 10 moves a vacuum-relief valve 26 also included in fuel cap 10 and mounted for movement in a flow path 34P, 34V, 34I, 34³ formed in filler-neck closure 12 from a normally closed position shown in FIG. 4 to an opened position shown in FIG. 5 in response to rotation of a closure cover 28 included in fuel cap 10 in a counterclockwise cap-removal direction as suggested in FIGS. 4A and 5A. Once vacuum-relief valve 26 has been moved to an opened position using any suitable means but before any normal sealing engagement between fuel cap 10 and fuel-tank filler neck 14 has been broken, pressurized fuel vapor extant in a fuel tank 11 coupled to fuel-tank filler neck 14 can flow through a fuel-conducting passageway 13 formed in fuel-tank filler neck 14 and then, in sequence, through chambers and channels formed in filler-neck closure 12, sealed vapor-transfer chamber 16, vent port 18 formed in filler neck 14, and vapor conduit 20 to reach fuel vapor recovery canister 22 without being discharged through fuel cap 10 to the surrounding atmosphere.

A fuel vapor transfer system 100 in accordance with the present disclosure comprises a fuel cap 10, a fuel-tank filler neck 14 formed to include a fuel-conducting passageway 13 sized to receive fuel cap 10 and a vent port 18 arranged to open into fuel-conducting passageway 13, a fuel vapor recovery canister 22, and a vapor conduit 20 arranged to interconnect vent port 18 and fuel vapor recovery canister 22 in fluid communication as suggested in FIGS. 4 and 5. In operation, any pressurized fuel vapor extant in fuel-conducting passageway 13 of filler neck 14 will flow through chambers and channels formed in fuel cap 10 into a sealed vapor-transfer chamber 16 formed between fuel cap 10 and fuel-tank filler neck 14 when fuel cap 10 is mounted in filler neck 14 to close a filler-neck mouth 14M opening into fuel-conducting passageway 13 and when vacuum-relief valve 26 in fuel cap 10 is moved to an opened position as suggested in FIG. 5. Then the pressurized fuel vapor will exit sealed vapor-transfer chamber 16 through vent port 18 and flow to fuel vapor recovery canister 22 through vapor conduit 20.

Vacuum-relief valve 26 is configured to provide means for regulating the flow of fuel vapor and air through fuel cap 10 and between fuel-tank filler neck 14 and a fuel vapor recovery canister 22 associated with fuel-tank filler neck 14 and exposed to the surrounding atmosphere. Vacuum-relief valve 26 moves in a flow path formed in fuel cap 10 from a closed position shown in FIG. 4 to block flow of fuel vapor or air between fuel vapor recovery canister 22 and fuel-tank filler neck 14 to an opened position shown in FIG. 5 to allow flow of fuel vapor or air between fuel vapor recovery canister 22 and fuel-tank filler neck 14 either when: (1) the level of negative tank pressure (i.e. vacuum) in fuel tank 11 is too high or (2) closure cover 28 of fuel cap 10 is turned in a counterclockwise cap-removal direction by a user during a tank-refueling activity. In the first instance, when a vacuum is present in fuel tank 11, a suction force is applied to the underside of vacuum-relief valve by negative pressure extant in fuel tank 11 and such a suction force pulls vacuum-relief valve 26 downwardly from a closed position shown in FIG. 3B to an opened position and atmospheric air flows from the atmosphere through a fuel-vapor recovery canister 22, a vapor conduit 20, past the opened vacuum-relief valve 26, and into a vapor space 11S provided in an interior region 11I of fuel tank 11 above any liquid fuel 11L extant in interior region 11I of fuel tank 32. In the second instance, when the fuel cap 10 is removed from filler neck 14 during a tank re-fueling activity, a valve mover 24 included in fuel cap 10 is actuated by rotation of closure cover 28 to move vacuum-relief valve 26 downwardly to an opened position as suggested in FIG. 5 to vent pressurized fuel vapor from vapor space 11S in fuel tank 11 to the atmosphere via the flow path 34P, 34V, 34I, 34³ and via sealed vapor-transfer chamber 16, vent port 18, vapor conduit 20, and fuel vapor recovery canister 22 before a liquid fuel and fuel vapor seal established between filler neck 14 and filler-neck closure 12 of fuel cap 10 is broken during removal of cap 10 from filler neck 14.

Figure 3A:
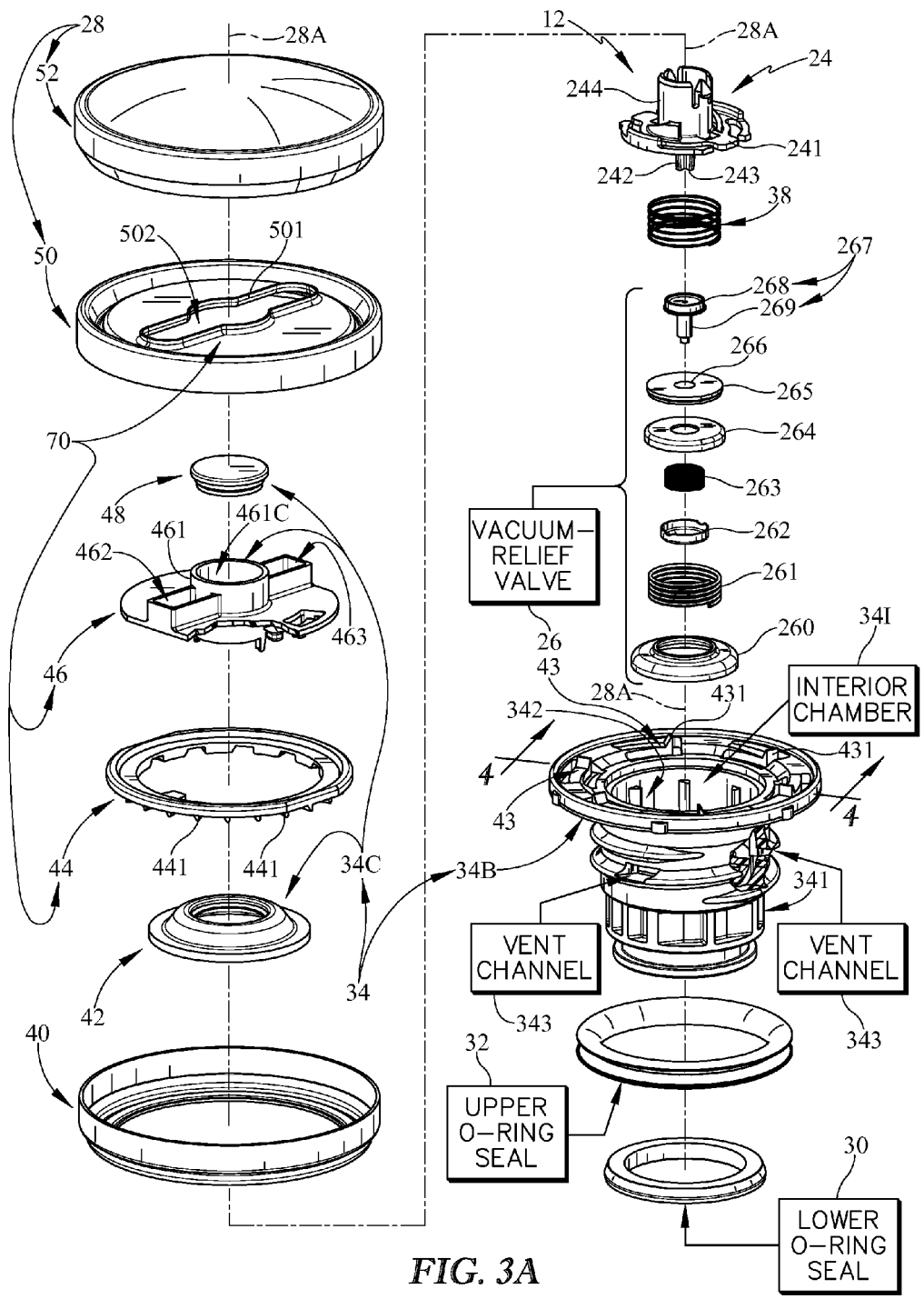

Fuel cap 10 illustratively comprises a filler-neck closure 12, a closure cover 28 arranged to rotate about an axis of rotation 28A relative to filler-neck closure 12, and a valve mover 24 coupled to closure cover 28 and filler-neck closure 12 as suggested in FIGS. 3A, 4, and 5. A closure mover 70 is coupled to closure cover 28, filler-neck closure 12, and valve mover 24. During installation of fuel cap 10 in fuel-tank filler neck 14, torque applied by a user to closure cover 28 is transmitted to filler-neck closure 12 using any suitable means (e.g. closure mover 70) to cause filler-neck closure 12 to rotate relative to filler neck 14 about axis of rotation 28A to cause filler-neck closure 12 to mate with filler neck 14 and close the filler-neck mouth 14M opening into fuel-conducting passageway 13 formed in filler neck 12. During removal of fuel cap 10 from fuel-tank filler neck 14, torque applied by a user to closure cover 28 is transmitted using any suitable means: (1) first to valve mover 24 to cause valve mover 24 to rotate about axis of rotation 28A and move a vacuum-relief valve 26 to an opened position so that pressurized fuel vapor in fuel-tank filler neck 14 can flow in filler-neck closure 12 past the opened vacuum-relief valve 26 and then through sealed vapor-transfer chamber 16, vent port 18, vapor conduit 20, and fuel vapor recovery canister 22 and (2) to filler-neck closure 12 to cause filler-neck closure 12 to rotate about axis of rotation 28A relative to fuel-tank filler neck 14 and break a liquid fuel and fuel vapor seal formed therebetween so that filler-neck closure 12 is disengaged from fuel-tank filler neck 14 to open the filler-neck mouth 14M opening into fuel-conducting passageway 13. Reference is made to U.S. Pat. No. 8,567,628 for disclosure relating to apparatus for rotating a filler-neck closure in clockwise direction relative to a filler neck during cap installation and for rotating a valve mover to move a vent valve to an opened position without rotating a filler-neck closure during an early stage of cap removal, which disclosure is hereby incorporated in its entirety herein. Reference is also made to U.S. Pat. No. 5,108,001 for disclosure relating to apparatus for opening a vent valve in a fuel cap during removal of the fuel cap from a filler neck, which disclosure is hereby incorporated in its entirety herein.

Figure 3B:
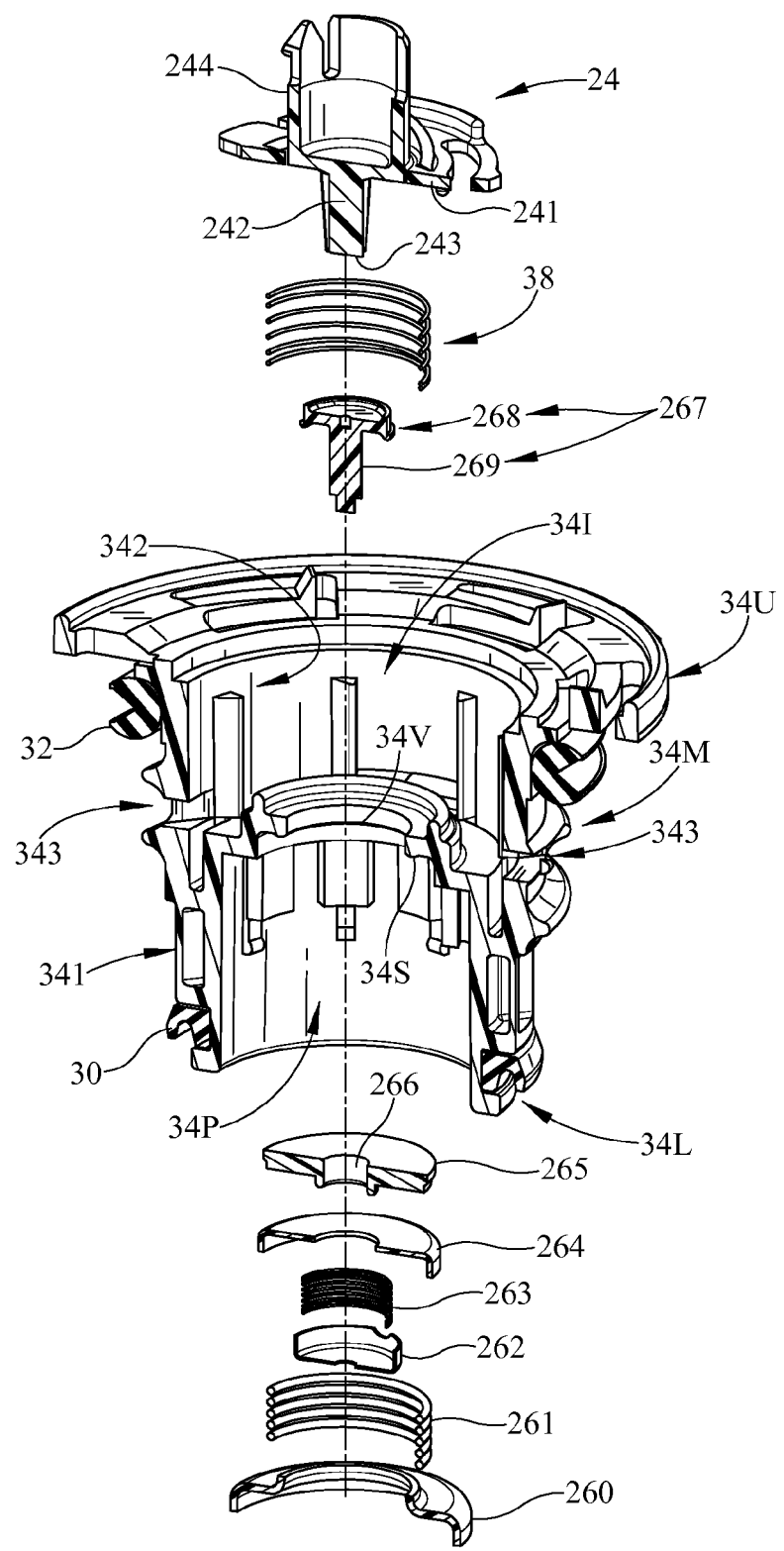

In illustrative embodiments, fuel cap 10 includes components shown in FIGS. 3A and 3B. As suggested in FIG. 31, fuel cap 10 comprises (from bottom to top): a lower O-ring seal 30, an upper O-ring seal 32, a closure body 34 configured to mate with fuel-tank filler neck 14 and carry lower and upper O-ring seals 30, 32, a vacuum-relief valve 26 comprising seven components, a valve-mover spring 38, valve mover 24, handgrip retainer ring 40, a body cap 42, a torque-transmission ring 44 associated with closure body 34, a torque converter 46 associated with valve mover 24 and with torque-transmission ring 44, a converter cap 48, a converter-drive plate 50, and a handgrip 52. In illustrative embodiments, handgrip 52, converter-drive plate 50, and handgrip-retainer ring 40 cooperate to form closure cover 28 as suggested in FIG. 3A. In illustrative embodiments, a vertical sleeve 461 included in torque converter 46, converter cap 48, and a base 34B configured to carry lower and upper O-ring seals 30, 32 cooperate to form closure body 34 as suggested in FIG. 3A. In illustrative embodiments, vacuum-relief valve 26 is configured to perform vacuum-relief and pressure-relief functions and comprises (from bottom to top) a first bottom spring-mount plate 260, a first spring 261, a second bottom spring-mount plate 262, a second spring 263, a first top spring-mount plate 264, a round first valve member 265 formed to include a central stem-receiving aperture 266 and associated with first spring 261, and a button 267 adapted to engage and be moved by valve mover 24 and formed to include a round second valve member 268 associated with second spring 263 and a guide stem 269 coupled to the underside of round second valve member 268 as suggested in FIG. 3A.

Filler-neck closure 12 includes a closure body 34 adapted to be extended into a fuel-conducting passageway 13 formed in a fuel-tank filler neck 14 as suggested in FIGS. 4 and 5. Closure body 34 includes a base 34B formed to include a vent aperture 34V adapted to communicate with the fuel-conducting passageway 13 formed in fuel-tank filler neck 14 when closure body 34 is mounted on the fuel-tank filler neck 14. Closure body 34 is also formed to include an interior chamber 34I arranged to lie in fluid communication with the vent aperture 34V formed in closure body 34. In an illustrative embodiment, base 34B of closure body 34 includes a lower sleeve 341 arranged to carry lower O-ring seal 30, a chamber floor 34F coupled to a top end of lower sleeve 341 and formed to include vent aperture 34V, an upper sleeve 342 arranged to extend upwardly from chamber floor 34F and in alignment with lower sleeve 341, and a chamber ceiling 34C coupled to a top end of lower sleeve 341. Chamber floor 34F, upper sleeve 342, and chamber ceiling 34C cooperate to define an interior chamber 34I formed in closure body 34 to communicate with vent aperture 34V and an open passageway 34P bounded by lower sleeve 341 and chamber floor 34F. Body cap 42, vertical sleeve 461 of torque converter 46, and converter cap 48 cooperate to define chamber ceiling 34C in an illustrative embodiment.

Filler-neck closure 12 also includes an upper O-ring seal 32 arranged to surround and mate with closure body 34 and adapted to mate with fuel-tank filler neck 14 as suggested in FIGS. 4 and 5. Upper O-ring seal 32 cooperates with closure body 34 to close a filler-neck mouth 14M opening into a fuel-conducting passageway 13 formed in the fuel-tank filler neck 14.

Filler-neck closure 12 also includes a vacuum-relief valve 26 mounted in the closure body 34 for movement relative to the closure body 34 from a normally closed position blocking flow of pressurized fuel vapor extant in the fuel-tank filler neck 14 through the vent aperture 34V into the interior chamber 34I of the closure body 34 as shown in FIG. 4 to an opened position shown, for example, in FIG. 5. In the opened position, air is allowed to flow from the atmosphere into the fuel-tank filler neck 14 via fuel vapor recovery canister 22, vapor conduit 20, vent port 18, sealed vapor-transfer chamber 16, vent channel 343, interior chamber 34I, vent aperture 34V, and open passageway 34P in response to exposure of the vacuum-relief valve 26 to fuel vapor extant in the fuel-tank filler neck 14 and characterized by negative pressure in excess of a predetermined negative pressure.

Closure cover 28 is arranged to overlie the filler-neck closure 12 and to be gripped by a user as suggested in FIGS. 4 and 5. Closure cover 28 is supported for rotational movement about axis of rotation 28A relative to the filler-neck closure 12.

Valve mover 24 is coupled to the closure cover 28 using any suitable means (e.g. closure mover 70) and to the vacuum-relief valve 26 as suggested in FIGS. 4 and 5. Valve mover 24 is arranged to move the vacuum-relief valve 26 from the normally closed position shown in FIG. 4 to the opened position shown in FIG. 5 in response to movement of the closure cover 28 about axis of rotation 28A relative to the filler-neck closure 12.

Closure body 34 also includes a side wall 341, 342 adapted to be surrounded by an interior surface of the fuel-tank filler neck 14 when the closure body 34 mates with the fuel-tank filler neck 14 and a portion 342 of the side wall 341, 342 of the closure body 34 is formed to include a vent channel 343 as suggested in FIGS. 4 and 5. Vent channel 343 has a channel inlet 344 opening into the interior chamber 34I formed in the closure body 34 and a channel outlet 345 adapted to open into the sealed vapor-transfer chamber 16 defined between filler-neck closure 12 and fuel-tank filler neck 14 when the closure body 34 and the upper O-ring seal 32 mate with the fuel-tank filler neck 14 to close the filler-neck mouth 14M opening into the fuel-conducting passageway 13 formed in the fuel-tank filler neck 14.

Closure body 34 includes an upper portion 34U adjacent to the closure cover 28, a lower portion 34L arranged to lie in spaced-apart relation to the upper portion 34U, and a middle portion 34M located between the upper and lower portions as suggested in FIGS. 3B, 4, and 5. Upper O-ring seal 32 is coupled to the middle portion 34M of the closure body 34.

Filler-neck closure 12 further includes a lower O-ring seal 30 coupled to the lower portion 34L of the closure body 34 to locate the upper O-ring seal 32 between a top wall of the closure cover 38 and the lower O-ring seal 30. Lower O-ring seal 30 is configured to provide means for sealing against an interior surface of the fuel-tank filler neck 14 when the closure body 34 is mounted on the fuel-tank filler neck 14 to close the filler-neck mouth 14M to cooperate with the upper O-ring seal 32 to establish a sealed vapor-transfer chamber 16 bounded by a portion of the side wall included in the middle portion 34M of the closure body 34 and formed to include the channel outlet 34S, the upper O-ring seal 32, a portion of the interior surface of the fuel-tank filler neck 14, and the lower O-ring seal 30 so that any pressurized fuel vapor that is discharged from the vent channel 343 formed in the closure body 34 through the channel outlet 34S flows into the sealed vapor-transfer chamber 16 provided outside the closure body 34 without flowing directly to the atmosphere surrounding fuel cap 10.

Fuel-tank filler neck 14 is adapted to be coupled in fluid communication to a fuel tank 11 and formed to include a fuel-conducting passageway 13 as suggested in FIGS. 4 and 5. Upper and lower O-ring seals 32, 30 are mounted on the closure body 34 and arranged to engage an interior surface of the fuel-tank filler neck 14 when the closure body 34 and upper O-ring seal 32 mate with the fuel-tank filler neck 14 to establish a sealed vapor-transfer chamber 16 bounded by the portion of the side wall included in the middle portion 34M of the closure body 34 and formed to include the channel outlet 34S, the upper O-ring seal 32, a portion of the interior surface of the fuel-tank filler neck 14, and the lower O-ring seal 30. Fuel-tank filler neck 14 is formed to include a vent port 18 opening into the sealed vapor-transfer chamber 16. A vapor conduit 20 is configured to conduct pressurized fuel vapor discharged from the sealed vapor-transfer chamber 16 into the vent port 18 formed in the fuel-tank filler neck 14 to a vapor-recovery canister 22. The sealed vapor-transfer chamber 16 has an annular shape and surrounds the closure body 34 of the filler-neck closure 12 in illustrative embodiments.

Valve mover 24 is arranged to extend into the interior chamber 34I formed in the closure body 34 and to move in the interior chamber 34I relative to the closure body 34. Valve mover 24 includes a plate 241 mounted for up-and-down movement in the interior chamber 34I between the chamber ceiling 34C and the chamber floor 34F, a plunger 242 coupled to an underside of the plate 241 to move therewith and formed to include a distal tip 243 arranged to engage the vacuum-relief valve 26 when the vacuum-relief valve 26 occupies the normally closed position. Valve mover 24 also includes an upstanding sleeve 244 coupled to plate 241 and arranged to move up-and-down inside a chamber 461C provided in a sleeve 461 included in torque converter 46. This up-and-down lost-motion movement of valve mover 24 relative to torque converter 46 allows upward movement of a second valve member 268 to an opened position separated from a first valve member 265 when exposed to pressurized fuel vapor extant in the open passageway 34P formed in closure body 34 to all pressurized fuel vapor from fuel tank 11 to pass through a central stem-receiving aperture 266 formed in second valve member 265 and flow through sealed vapor-transfer chamber 16 to reach fuel vapor recovery canister 22.

Valve mover 24 also includes means for moving the plunger 242 downwardly relative to closure body 34 to move the vacuum-relief valve 26 from the normally closed position shown in FIG. 4 to an opened position shown in FIG. 5 in response to rotation of the closure cover 28 in a counterclockwise cap-removal direction about an axis of rotation 28A relative to the closure body 34 while the closure body 34 and the upper O-ring seal 32 mate with the fuel-tank filler neck 14 and the lower O-ring seal 30 mates with the fuel-tank filler neck 14 to form the sealed vapor-transfer chamber 16. By opening vacuum-relief valve 26 any pressurized fuel vapor extant in the fuel-conducting passageway 13 formed in the fuel-tank filler neck 14 is vented through the vent aperture 34V formed in the closure body 34, past the opened vacuum-relief valve 26 and into the interior chamber 34I, through the vent channel 343 formed in the closure body 34 and into the sealed vapor-transfer chamber 16 provided outside of the closure body 34, and then through the vent port 18 formed in the fuel-tank filler neck 14 and into the vapor conduit 20 for delivery to the vapor-recovery canister 22 without disrupting movement of the vacuum-relief valve 26 to the opened position in response to exposure of the vacuum-relief valve 26 to fuel vapor extant in the fuel-tank filler neck 14 and characterized by negative pressure in excess of the predetermined negative pressure.

Spring means 38 is located in the interior chamber 34I formed in the closure body 34 as suggested in FIG. 4 for yieldably urging the valve mover 24 to move relative to the closure body 34 in an upward direction toward the closure cover 28 to an inactive position arranged to overlie the vacuum-relief valve 26 as shown for example, in FIG. 4. Closure body 34 includes a chamber floor 34F formed to include the vent aperture 34V. The spring means 38 is arranged to engage an upwardly facing surface included in the chamber floor 34F and arranged to define a boundary of the interior chamber 34I. The vacuum-relief valve 26 is arranged to engage a downwardly facing surface included in the chamber floor 34F upon movement of the vacuum-relief valve 26 to assume the normally closed position. The spring means 38 is formed to include open space through which pressurized fuel vapor flows as the pressurized fuel vapor flows through the interior chamber 34I from the vent aperture 18 formed in the chamber floor 34F to the channel inlet 344 formed in the side wall of the closure body 34 as suggested in FIG. 5.

Closure body 34 further includes an annular valve seat 34S arranged to surround the vent aperture 34V and lie outside the interior chamber 34I as suggested in FIGS. 4 and 5. Vacuum-relief valve 26 includes a first valve member 265 arranged to engage the annular valve seat 34S when the vacuum-relief valve 26 is moved to assume the closed position and formed to include a central stem-receiving aperture 266, a first position-control spring system 260, 261, 264 coupled to the closure body 34 and arranged to urge the first valve member 265 normally to engage the annular valve seat 34S, a second valve member 268 arranged to lie between the valve mover 24 and the first valve member 265, a guide stem 269 coupled to the second valve member 268 and arranged to extend through the central stem-receiving aperture 266 formed in the first valve member 265, and a second position-control spring system 262, 263 coupled to the second valve member 268 and the guide stem 264 and arranged to urge the second valve member 268 normally to engage the first valve member 265 to close the central stem-receiving aperture 266. The plunger 242 is arranged to move in the interior chamber 34I formed in the closure body 34 to engage the second valve member 268 of the vacuum-relief valve 26 to move the vacuum-relief valve 26 from the normally closed position shown in FIG. 4 to the opened position shown in FIG. 5 in response to rotation of the closure cover 28 in the counterclockwise cap-removal direction about the axis of rotation 28A.

A coiled compression spring 38 is located in the interior chamber 34I of the closure body 34 as suggested in FIGS. 4 and 5. The coiled compression spring 38 is arranged to surround the plunger 242 of the valve mover 24 and engage the chamber floor 34F of the closure body 34 and the plate 241 of the valve mover 24. The coiled compression spring 38 is formed to include open space through which pressurized fuel vapor flows as pressurized fuel vapor flows through the interior chamber 34I from the vent aperture 34V formed in the chamber floor 34F to the channel inlet 343 formed in the side wall of the closure body 34 as suggested in FIG. 5.

Filler-neck closure 12 further includes an exterior thread coupled to an exterior surface of the portion of the side wall included in the middle portion 34M of the closure body 34 as suggested in FIGS. 3A, 4, and 5. The channel outlet 345 is formed to lie in the exterior thread as suggested in FIGS. 4 and 5.

In illustrative embodiments, the vacuum-relief valve 26 includes a large-diameter first valve member 265 formed to include a topside exterior surface facing upwardly toward the closure cover 28, an underside exterior surface facing downwardly away from the closure cover 28, and a central stem-receiving aperture 266 having an opening in each of the topside and underside exterior surfaces. The first position-control spring system 260, 261, 264 is coupled to the closure body 34 and arranged to engage the underside exterior surface of the large-diameter first valve member 265 yieldably to urge the large-diameter first valve member 265 to engage an annular valve seat 34S formed in the closure body 34 to surround the vent aperture 34V. A small-diameter second valve member 268 is arranged to lie between the large-diameter first valve member 265 and the valve mover 24. A guide stem 269 is coupled to an underside of the small-diameter second valve member 268 and to extend downwardly through the central stem-receiving aperture 266 formed in the large-diameter first valve member 265 to allow relative movement between the small-diameter and large-diameter valve members 268, 265. A second position-control spring system 262. 263 is coupled to the large-diameter valve member 265 and the guide stem 269. The second position-control spring system is configured yieldably to urge the small-diameter second valve member 268 to engage the topside exterior surface of the large-diameter first valve member 265 normally to block flow of pressurized fuel vapor into the interior chamber 34I formed in the closure body 34 through the vent aperture 34V until the underside of the small-diameter second valve member 268 is exposed to fuel vapor extant in the valve aperture 34V formed in the closure body 34 and characterized by positive pressure in excess of a predetermined positive pressure.

Valve mover 24 includes a plunger 242 located in the interior chamber 34I formed in the closure body 34 as suggested in FIGS. 4 and 5. Valve mover 34 is arranged to engage a topside exterior surface of the small-diameter second valve member 268 when the large-diameter first valve member 265 occupies a normally closed position engaging the annular valve seat 34S to block flow of fuel vapor through the vent aperture 34V and to move downwardly in the interior chamber 34I away from the closure cover 28 to move the large-diameter first valve member 265 to disengage the annular valve seat 34S to cause the vacuum-relief valve 26 to move from the normally closed position shown in FIG. 4 to an opened position shown in FIG. 5 in response to movement of the closure cover 28 in a counterclockwise cap-removal direction relative to the closure body 34.

Closure body 34 includes a chamber floor 34F formed to include the vent aperture 34V and define an annular valve seat 34S arranged to surround the vent aperture 34V and mate with the vacuum-relief valve 26 when the vacuum-relief valve 26 is in the normally closed position as suggested in FIG. 4. Closure body 34 also includes a sleeve 342 arranged to extend upwardly from the chamber floor 34F to define a portion of the side wall included in the middle portion 34M of the closure body 34 and formed to include the vent channel 343. Closure body 34 also includes a chamber ceiling 34C coupled to the sleeve 342 and arranged to lie in spaced-apart relation to the chamber floor 34F to define the interior chamber 34I therebetween. Valve mover 24 is mounted for up-and-down movement in the interior chamber 34I formed in the closure body 34 (and in chamber 461C formed in sleeve 461 of torque converter 46) from a raised position arranged to lie in close proximity to the closure cover 28 in a downward direction away from the closure cover 28 toward the chamber floor 34F to a lowered position arranged to engage the vacuum-relief valve 26 and move the vacuum-relief valve 26 from the normally closed position to the opened position.

The spring means 38 is located in the interior chamber 34I for yieldably urging the valve mover 24 from the opened position toward the normally closed position without blocking flow of pressurized fuel vapor entering the interior chamber 34I through the vent aperture 34V formed in the floor 34F from exiting the interior chamber 34I through the vent channel 343 formed in the side wall. The spring means 38 is a helically wound coiled compression spring formed to include a helically winding gap through which pressurized fuel vapor flows during passage through the interior chamber 34I from the vent aperture 34V formed in the chamber floor 34F to the vent channel 343 formed in the side wall. The valve mover 24 includes a horizontal plate 241 arranged for up-and-down movement in a region of the interior chamber 34I bounded by the sleeve 342, an upstanding sleeve 244 coupled to a topside of the horizontal plate 241 and arranged to extend upwardly toward a top wall of the closure cover 28, and a depending plunger 242 coupled to an underside of the horizontal plate 241 and arranged to extend downwardly toward the vacuum-relief valve 26 through a cavity formed in the spring means 38.

Closure body 34 includes a side wall arranged to lie between the upper and lower O-ring seals 32, 30 and to be surrounded by a fuel-tank filler neck 14 when the filler-neck closure 12 is mounted on the fuel-tank filler neck 14 as suggested in FIGS. 4 and 5. Closure body 34 is formed to include an interior chamber 34I, a vent aperture 34V opening into the interior chamber 34I and adapted to communicate with a fuel-conducting passageway 13 formed in a fuel-tank filler neck 14 when the filler-neck closure 12 is mounted on the fuel-tank filler neck 14, and an annular valve seat 34S located outside of the interior chamber 34I and arranged to surround the vent aperture 34V. Filler-neck closure also includes a vacuum-relief valve 26 mounted in the closure body 34 for movement relative to the closure body 34 from a normally closed position blocking flow of pressurized fuel vapor extant in the fuel-tank filler neck 14 through the vent aperture 34V into the interior chamber 34I of the closure body 34 to an opened position allowing flow of air into the fuel-tank filler neck 14 in response to exposure of the vacuum-relief valve 26 to fuel vapor extant in the fuel-tank filler neck 14 and characterized by negative pressure in excess of a predetermined negative pressure. The upper O-ring seal 32, the lower O-ring seal 30, and the side wall 341, 342 therebetween cooperate to form means for cooperating with the fuel-tank filler neck 14 to form a sealed vapor-transfer chamber 16 when the filler-neck closure 12 is mounted on the fuel-tank filler neck 14. The side wall 341, 342 of the closure body 34 is formed to include a vent channel 343 to conduct pressurized fuel vapor that has been admitted into the interior chamber 34I through the vent aperture 34V when the vacuum-relief valve 26 is moved to the opened position into the sealed vapor-transfer chamber 16.

Fuel-tank filler neck 14 is formed to include a vent port 18 opening into the sealed vapor-transfer chamber 16 to communicate with pressurized fuel vapor extant therein as suggested in FIGS. 4 and 5. A vapor conduit 20 is configured to conduct pressurized fuel vapor discharged from the sealed vapor-transfer chamber 16 into the vent port 18 to a vapor-recovery canister 22.

Fuel-tank filler neck 14 includes a threaded section as suggested in FIGS. 4 and 5. Closure body 34 includes a threaded section configured to mate with the threaded section of the filler neck 14 to retain the filler-neck closure 12 in a mounted position in the fuel-conducting passageway 13 formed in the fuel-tank filler neck 14. The threaded section of the closure body 34 is formed to include a channel outlet 345 opening into the vent channel 343 and communicating with the sealed vapor-transfer chamber 16.

Fuel-tank filler neck 14 is formed to include a filler-neck mouth 14M opening into the fuel-conducting passageway 13 as suggested in FIGS. 4 and 5. The vent port 18 is arranged to lie in spaced-apart relation to the filler-neck mouth 14M to locate the threaded section of the fuel-tank filler neck 14 therebetween.

A closure mover 70 is included in fuel cap 10 to transmit torque applied to closure cover 28 to filler-neck closure 12 to cause filler-neck closure 12 to turn in fuel-conducting passageway 13 formed in fuel-tank filler neck 14 during filler-neck closure 12 installation in or removal from fuel-tank filler neck 14. Closure mover 70 comprises torque converter 46, torque-transmission ring 44, and a series of deflectable motion-control arms 43 coupled to an upper portion 34U of closure body 34 as shown, for example, in FIGS. 3A and 4. Converter-drive plate 50 in closure cover 28 includes a drive flange 501 formed to include post receiver 502 sized to receive upstanding first and second posts 462, 463 included in torque converter 46 along with upstanding sleeve 461 as suggested in FIGS. 3A and 4. Torque converter 46 is configured to mate with torque-transmission ring 44 so that ring 44 rotates about axis of rotation 28A in response to rotation of closure cover 28 about axis of rotation 28A. Downwardly extending teeth 441 included in torque-transmission ring 44 mate with upwardly extending teeth 431 included in motion-control arms 43 to cause closure body 34 to be rotated about axis of rotation 28A in response to rotation of torque-transmission ring 44 unless an excessive amount of torque is applied to closure cover 28. Torque-converter 46 is also configured to include a cam system for applying torque to valve mover 24 to cause valve mover 24 to rotate about axis of rotation 28 in response to rotation of torque-transmission ring 44 during an early stage of removal of fuel cap 10 from fuel-tank filler neck 14.

A fuel cap 110 in accordance with a second embodiment of the present disclosure includes a filler-neck closure 112 adapted to move relative to a fuel-tank filler neck 14 and close a mouth 14M opening into a fuel-conducting passageway 13 formed in the filler neck 14, and a closure cover 128 adapted to be gripped by a user and rotated about a vertical axis of rotation 128A relative to the filler-tank fuel neck 14 as suggested in FIGS. 6-10. A closure mover 123 is coupled to the closure cover 128 and the filler-neck closure 112 and configured to transmit torque applied to the closure cover 128 to the filler-neck closure 12 using any suitable means.

Filler-neck closure 112 includes a closure body 134 and a pressure-relief valve 60 coupled to the closure body 34 and configured to vent excessive pressurized fuel vapor from the fuel-tank filler neck 14 to atmosphere via a sealed vapor-transport chamber 116 described herein to a fuel vapor recovery canister 22. The filler-neck closure 112 also includes a vacuum-relief valve 126 coupled to the closure body 134 and configured normally to dissipate vacuum in the fuel tank 11 by admitting atmosphere that has passed through fuel vapor recovery canister 22 into the filler neck 14 and fuel tank 11.

Fuel cap 110 further includes a pair of O-ring seals 30, 32 that are mounted on the closure body 134 and arranged to engage the fuel-tank filler neck 14 to create a sealed vapor-transfer chamber 116 that is located in an annular space formed between the closure body 134 of the filler-neck closure 112 and the fuel-tank filler neck 14. The sealed vapor-transfer chamber 116 created by the O-ring seals 30, 32 in cooperation with the closure body 134 and filler neck 14 is sealed off from the atmosphere around the fuel cap 10 and filler neck 14 but is connected to a fuel vapor recovery canister 22 spaced apart from the fuel-tank filler neck 14 by a vapor conduit 20. During removal of the fuel cap 10 from the fuel-tank filler neck 14, the sealed vapor-transfer chamber 116 receives pressurized fuel vapor from the fuel tank 11 and conducts pressurized fuel vapor to the fuel vapor recovery canister 20 through the vapor conduit 20 without discharging fuel vapor directly to the atmosphere through the mouth 14M of the filler neck 14.

Fuel cap 110 further includes a valve mover 124 coupled to the closure cover 128 to provide means for opening the vacuum-relief valve 26 in response to rotation of the closure cover 128 in a counterclockwise cap-removal direction by a user so that pressurized fuel vapor in the fuel-tank filler neck 14 is vented to the fuel vapor recovery canister 22, in sequence, through the opened vacuum-relief valve 26, the sealed vapor-transfer chamber 116, and vapor conduit 20 prior to breaking a sealed connection established between the filler-neck closure 112 and the fuel-tank filler neck 14. The vacuum-relief valve 126 is positioned to lie in the closure body 134 to lie laterally alongside and in spaced-apart relation to the pressure-relief valve 60 and in spaced-apart relation to a vertical axis of rotation 128A associated with the rotatable closure cover 128.

In illustrative embodiments, the valve mover 124 is configured to convert rotary movement of the closure cover 128 into downward movement of the vacuum-relief valve 126 relative to the closure body 134. Application of a downward force by the valve mover 124 to the vacuum-relief valve 126 causes the vacuum-relief valve 126 to move downwardly in a passageway formed in the closure body 134 from a normally closed position to an opened position and act to provide pressure relief to vent pressurized fuel vapor from the fuel tank 11 to the sealed vapor-transfer chamber 116 and the fuel vapor recovery canister 22 via the vapor conduit 20 during removal of the fuel cap 10 from the filler neck 14 but before separation of the filler-neck closure 112 from the filler neck 14 so that this vented pressurized fuel vapor flows to the fuel vapor recovery canister 22 instead of directly to the atmosphere.

Vacuum-relief valve 126 is mounted for movement in an interior chamber 134I formed in closure body 134 also included in filler-neck closure 112 as shown diagrammatically in FIGS. 9 and 10. Vacuum-relief valve 126 moves in interior chamber 134I from a closed position shown in FIG. 9 to block flow of fuel vapor or atmosphere between interior chamber 134I and fuel tank 11 to an opened position shown in FIG. 10 to allow flow of fuel vapor or atmosphere between interior chamber 134I and fuel tank 11 either when (1) the level of negative tank pressure (i.e. vacuum) in fuel tank 11 is too high or (2) fuel cap 110 is turned in a cap-removal direction by a user during a tank-refueling activity.

In a tank-vacuum mode of operation, vacuum-relief valve 126 is opened automatically in response to negative pressure (i.e., vacuum conditions) extant in fuel tank 11 to admit atmosphere into filler neck 14 to relieve excess negative tank pressure in fuel tank 11. Atmosphere is introduced into fuel tank 11 after being pulled through a fuel vapor recovery canister 22 and a vapor conduit 20 coupled to the filler neck 14 via a sealed vapor-transfer chamber 16 provided between closure body 134 and filler neck 14. In an alternative mode of operation, vacuum-relief valve 126 is opened automatically during cap removal as part of a tank refueling activity to vent excess pressurized fuel vapor in fuel tank 11 to the fuel vapor recovery canister 22 via sealed vapor-transfer chamber 16 and vapor conduit 20 as suggested in FIG. 10. In accordance with the present disclosure, vacuum-relief valve 126 is configured to be opened automatically by exposure of vacuum-relief valve 126 to sufficient negative tank pressure extant in fuel tank 11 in a pull-down vacuum activation mode and, alternatively, opened automatically by exposure to a downward valve-moving force applied by a valve mover 124 to vacuum-relief valve 126 during rotation of cover 18 about axis of rotation 128A in a cap-removal direction by a user as suggested diagrammatically in FIG. 10.

Valve mover 124 is coupled to and positioned to lie between closure cover 128 and vacuum-relief valve 126 in a space provided between closure cover 128 and closure body 134 as shown diagrammatically in FIGS. 9 and 10. Valve mover 124 is configured to move (e.g., push) vacuum-relief valve 126 relative to closure body 134 in the interior chamber 134I formed in closure body 134 from a normally closed position (shown in FIG. 9) downwardly to an opened position (shown in FIG. 10) to vent pressurized fuel vapor extant in fuel tank 11 and filler neck 14 to the fuel vapor recovery canister 22 via a sealed vapor-transfer chamber 116 and a vapor conduit 20 during a first stage of rotation (suggested in FIG. 10) that takes place during removal of the fuel cap 10 from the filler neck 14.

Fuel cap 110 also includes a pair of O-ring seals 30, 32 arranged to lie between the rest of the fuel cap 110 and the filler neck 14 to define a sealed vapor-transfer chamber 116 located radially in an annular space provided between the closure body 134 and the filler neck 14 when the fuel cap 110 is mounted on the filler neck 14 as shown in FIG. 9. O-ring seals 30, 32 provide means for cooperating with closure body 134 and fuel-tank filler neck 14 to define and maintain sealed vapor-transfer chamber 116 between closure body 134 and filler neck 14 during a first stage of rotation of cover 128 (illustratively corresponding to arrow 71 in FIG. 9A) relative to the filler neck 14. Because sealed vapor-transfer chamber 116 is maintained during the first stage of rotation when vacuum-relief valve 126 is opened, sealed vapor-transfer chamber 116 (i) receives pressurized vapor vented past the temporarily opened vacuum-relief valve 126 as suggested by the pressure gauges corresponding to filler neck 14 and vapor-transfer chamber 116 and (ii) conducts pressurized vapor from vapor-transfer chamber 116 into vapor conduit 20 extending from a vent port 18 formed in filler neck 14 before mouth 14M of filler neck 14 is reopened to atmosphere in response to a second stage of rotation of closure cover 128 relative to filler neck 14.

In an illustrative embodiment, vacuum-relief valve 126 is shown in a normally closed position in FIG. 9. Any pressurized fuel vapor extant in fuel tank 11 and fuel-conducting passageway 13 of filler neck 14 is vented past the opened vacuum-relief valve 126 that is opened by valve mover 124 during a first stage of rotation in the cap-removal direction before closure body 134 begins to rotate in a second stage of rotation in the cap-removal direction in which the fuel cap 110 is decoupled from the filler neck 14. When the pressurized fuel vapor vents past the opened vacuum-relief valve 126, it is received by the vapor-transfer chamber 116 and then conducted by vapor-transfer chamber 116 to vent port 18 formed in the filler neck 14 that is connected to the fuel vapor recovery canister 22 via a vapor conduit 20 as shown in FIG. 10. By transferring the pressurized fuel vapor to the fuel vapor recovery canister 22 before allowing a consumer to lift the fuel cap 110 up and away from the filler neck 14, fuel vapor emission into the atmosphere may be minimized suggesting that fuel vapor is not passed from the filler neck 14 to the atmosphere when the fuel cap 110 removed from the filler neck 14.

The invention claimed is:
1. A fuel vapor transfer system comprising
a filler-neck closure including a closure body adapted to be extended into a fuel-conducting passageway formed in a fuel-tank filler neck, the closure body being formed to include a vent aperture adapted to communicate with the fuel-conducting passageway formed in the fuel-tank filler neck when the closure body is mounted on the fuel-tank filler neck, the closure body also being formed to include an interior chamber arranged to lie in fluid communication with the vent aperture formed in the closure body, the filler-neck closure also including an upper O-ring seal arranged to surround and mate with the closure body and adapted to mate with the fuel-tank filler neck and cooperate with the closure body to close a filler-neck mouth opening into the fuel-conducting passageway formed in the fuel-tank filler-neck and a vacuum-relief valve mounted in the closure body for movement relative to the closure body from a normally closed position blocking flow of pressurized fuel vapor extant in the fuel-tank filler neck through the vent aperture into the interior chamber of the closure body to an opened position allowing flow of air from the atmosphere into the fuel-tank filler neck in response to exposure of the vacuum-relief valve to fuel vapor extant in the fuel-tank filler neck and characterized by negative pressure in excess of a predetermined negative pressure,
a closure cover arranged to overlie the filler-neck closure and to be gripped by a user and supported for movement relative to the filler-neck closure, and
a valve mover coupled to the vacuum-relief valve and arranged to move the vacuum-relief valve from the normally closed position to the opened position in response to movement of the closure cover relative to the filler-neck closure, wherein the closure body also includes a side wall adapted to be surrounded by an interior surface of the fuel-tank filler neck when the closure body mates with the fuel-tank filler neck and the side wall of the closure body is formed to include a vent channel having a channel inlet opening into the interior chamber formed in the closure body and a channel outlet adapted to open into the fuel-conducting passageway formed in the fuel-tank filler neck when the closure body and the upper O-ring seal mate with the fuel-tank filler neck to close the filler-neck mouth opening into the fuel-conducting passageway formed in the fuel-tank filler neck.

2. The fuel vapor transfer system of claim 1, wherein the closure body includes an upper portion adjacent to the closure cover, a lower portion arranged to lie in spaced-apart relation to the upper portion, and a middle portion located between the upper and lower portions, the upper O-ring seal is coupled to the middle portion of the closure body, the filler-neck closure further includes a lower O-ring seal coupled to the lower portion of the closure body to locate the upper O-ring seal between a top wall of the closure cover and the lower O-ring seal, the lower O-ring seal is configured to provide means for sealing against an interior surface of the fuel tank filler neck when the closure body is mounted on the fuel-tank filler neck to close the filler-neck mouth to cooperate with the upper O-ring seal to establish a sealed vapor-transfer chamber bounded by a portion of the side wall included in the middle portion of the closure body and formed to include the channel outlet, the upper O-ring seal, a portion of the interior surface of the fuel-tank filler neck, and the lower O-ring seal so that any pressurized fuel vapor that is discharged from the vent channel formed in the closure body through the channel outlet flows into the sealed vapor-transfer chamber provided outside the closure body.

3. The fuel vapor transfer system of claim 2, further comprising a fuel-tank filler neck adapted to be coupled in fluid communication to a fuel tank and formed to include a fuel-conducting passageway, wherein the upper and lower O-ring seals mounted on the closure body are arranged to engage an interior surface of the fuel-tank filler neck when the closure body and upper O-ring seal mate with the fuel-tank filler neck to establish a sealed vapor-transfer chamber bounded by the portion of the side wall included in the middle portion of the closure body and formed to include the channel outlet, the upper O-ring seal, a portion of the interior surface of the fuel tank filler neck, and the lower O-ring seal, and wherein the fuel-tank filler neck is formed to include a vent port opening into the sealed vapor-transfer chamber, and further comprising a vapor conduit configured to conduct pressurized fuel vapor discharged from the sealed vapor-transfer chamber into the vent port formed in the fuel-tank filler neck to a vapor-recovery canister.

4. The fuel vapor transfer system of claim 3, wherein the sealed vapor-transfer chamber has an annular shape and surrounds the closure body of the filler-neck closure.

5. The fuel vapor transfer system of claim 2, wherein the valve mover is arranged to extend into the interior chamber formed in the closure body and to move in the interior chamber relative to the closure body and the valve mover includes a plate mounted for up-and-down movement in the interior chamber between a chamber ceiling and a chamber floor, a plunger coupled to an underside of the plate to move therewith and formed to include a distal tip arranged to face toward the vacuum-relief valve when the vacuum-relief valve occupies the normally closed position, and means for moving the plunger downwardly in the interior chamber away from the closure cover to move the vacuum-relief valve from the normally closed position to an opened position in response to rotation of the closure cover in a cap-removal direction about an axis of rotation relative to the closure body while the closure body and the upper O-ring seal mate with the fuel-tank filler neck and the lower O-ring seal mates with the fuel-tank filler neck to form the sealed vapor-transfer chamber to vent any pressurized fuel vapor extant in the fuel-conducting passageway formed in the fuel-tank filler neck through the vent aperture formed in the closure body, past the vacuum-relief valve and into the interior chamber, through the vent channel formed in the closure body and into the sealed vapor-transfer chamber provided outside of the closure body, and through the vent port formed in the fuel-tank filler neck and into the vapor conduit for delivery to a vapor-recovery canister without disrupting movement of the vacuum-relief valve to the opened position in response to exposure of the vacuum-relief valve to fuel vapor extant in the fuel-tank filler neck and characterized by negative pressure in excess of the predetermined negative pressure.

6. The fuel vapor transfer system of claim 5, further comprising spring means located in the interior chamber formed in the closure body for yieldably urging the valve mover to move relative to the closure body in an upward direction toward the closure cover to a raised inactive position separated from the vacuum-relief valve.

7. The fuel vapor transfer system of claim 6, wherein the closure body includes a chamber floor formed to include the vent aperture, the spring means is arranged to engage an upwardly facing surface included in the chamber floor and arranged to define a boundary of the interior chamber, and the vacuum-relief valve is arranged to engage a downwardly facing surface included in the chamber floor upon movement of the vacuum-relief valve to assume the normally closed position, and the spring means is formed to include open space through which pressurized fuel vapor flows as the pressurized fuel vapor flows through the interior chamber from the vent aperture formed in the chamber floor to the channel inlet formed in the side wall of the closure body.

8. The fuel vapor transfer system of claim 5, wherein the closure body further includes an annular valve seat arranged to surround the vent aperture and lie outside the interior chamber, the vacuum-relief valve includes a first valve member arranged to engage the annular valve seat when the vacuum-relief valve is moved to assume the closed position and formed to include a central stem-receiving aperture, a first position-control spring system coupled to the closure body and arranged to urge the first valve member normally to engage the annular valve seat, a second valve member arranged to lie between the valve mover and the first valve member, a guide stem coupled to the first valve member and arranged to extend through the central stem-receiving aperture formed in the first valve member, and a second position-control spring system coupled to the first valve member and the guide stem and arranged to urge the second valve member normally to engage the first valve member to close the central stem-receiving aperture, and wherein the plunger is arranged to move in the interior chamber formed in the closure body to engage the second valve member of the vacuum-relief valve to move the vacuum-relief valve from the normally closed position to the opened position in response to rotation of the closure cover in the cap-removal direction about the axis of rotation.

9. The fuel vapor transfer system of claim 8, further comprising a coiled compression spring located in the interior chamber of the closure body and arranged to surround the plunger of the valve mover and engage the chamber floor of the closure body and the plate of the valve mover and the coiled spring is formed to include open space through which pressurized fuel vapor flows as pressurized fuel vapor flows through the interior chamber from the vent aperture formed in the chamber floor to the channel inlet formed in the side wall of the closure body.

10. The fuel vapor transfer system of claim 2, wherein the filler-neck closure further includes an exterior thread coupled to an exterior surface of the portion of the side wall included in the middle portion of the closure body and the channel outlet is formed to lie between the upper O-ring seal and the exterior thread.

11. The fuel vapor transfer system of claim 2, wherein the vacuum-relief valve includes a large-diameter first valve member formed to include a topside exterior surface facing upwardly toward the closure cover, an underside exterior surface facing downwardly away from the closure cover, and a central stem-receiving aperture having an opening in each of the topside and underside exterior surfaces, a first position-control spring system coupled to the closure body and arranged to engage the underside exterior surface of the large-diameter first valve member yieldably to urge the large-diameter first valve member to engage an annular valve seat formed in the closure body to surround the vent aperture, a small-diameter second valve member arranged to lie between the large-diameter first valve member and the valve mover, a guide stem coupled to an underside of the small-diameter second valve member and to extend downwardly through the central stem-receiving aperture formed in the large-diameter first valve member to allow relative movement between the small-diameter and large-diameter valve members, and a second position-control spring system coupled to the large-diameter valve member and the guide stem and configured yieldably to urge the small-diameter second valve member to engage the topside exterior surface of the large-diameter first valve member normally to block flow of pressurized fuel vapor into the interior chamber formed in the closure body through the vent aperture until the underside of the small-diameter second valve member is exposed to fuel vapor extant in the valve aperture formed in the closure body and characterized by positive pressure in excess of a predetermined positive pressure, and the valve mover includes a plunger located in the interior chamber formed in the closure body and arranged to face toward a topside exterior surface of the small-diameter second valve member when the large-diameter first valve member occupies a normally closed position engaging the annular valve seat to block flow of fuel vapor through the vent aperture and to move downwardly in the interior chamber away from the closure cover to move the large-diameter first valve member to disengage the annular valve seat to cause the vacuum-relief valve to move from the normally closed position to an opened position in response to movement of the closure cover in a cap-removal direction relative to the closure body.

12. The fuel vapor transfer system of claim 1, wherein the closure body includes a chamber floor formed to include the vent aperture and define an annular valve seat arranged to surround the vent aperture and mate with the vacuum-relief valve when the vacuum-relief valve is in the normally closed position, a sleeve arranged to extend upwardly from the chamber floor to define a portion of the side wall included in the middle portion of the closure body and formed to include the vent channel, and a chamber ceiling coupled to the sleeve and arranged to lie in spaced-apart relation to the chamber floor to define the interior chamber therebetween.

13. The fuel vapor transfer system of claim 12, the valve mover is mounted for up-and-down movement in the interior chamber formed in the closure body from a raised position arranged to lie in close proximity to the closure cover in a downward direction away from the closure cover toward the chamber floor to a lowered position arranged to move the vacuum-relief valve from the normally closed position to the opened position.

14. The fuel vapor transfer system of claim 13, further comprising spring means located in the interior chamber for yieldably urging the valve mover from the opened position toward the normally closed position without blocking flow of pressurized fuel vapor entering the interior chamber through the vent aperture formed in the floor from exiting the interior chamber through the vent channel formed in the side wall.

15. The fuel vapor transfer system of claim 14, wherein the spring means is a helically wound coiled compression spring formed to include a helically winding gap through which pressurized fuel vapor flows during passage through the interior chamber from the vent aperture formed in the chamber floor to the vent channel formed in the side wall.

16. The fuel vapor transfer system of claim 14, wherein the valve mover includes a horizontal plate arranged for up-and-down movement in a region of the interior chamber bounded by the sleeve, an upstanding post coupled to a topside of the horizontal plate and arranged to extend upwardly toward a top wall of the closure cover, and a depending plunger coupled to an underside of the horizontal plate and arranged to extend downwardly toward the vacuum-relief valve through a cavity formed in the spring means.

17. A fuel vapor transfer system comprising a filler-neck closure including a closure body, an upper O-ring seal coupled to an exterior surface of the closure body, and a lower O-ring seal coupled to the exterior surface of the closure body and arranged to lie in spaced-apart relation to the upper O-ring seal, the closure body including a side wall arranged to lie between the upper and lower O-ring seals and to be surrounded by a fuel-tank filler neck when the filler-neck closure is mounted on the fuel-tank filler neck, the closure body being formed to include an interior chamber, a vent aperture opening into the interior chamber and adapted to communicate with a fuel-conducting passageway formed in a fuel-tank filler neck when the filler-neck closure is mounted on the fuel-tank filler neck, and an annular valve seat located outside of the interior chamber and arranged to surround the vent aperture, the filler-neck closure also including a vacuum-relief valve mounted in the closure body for movement relative to the closure body from a normally closed position blocking flow of pressurized fuel vapor extant in the fuel-tank filler neck through the vent aperture into the interior chamber of the closure body to an opened position allowing flow of air into the fuel-tank filler neck in response to exposure of the vacuum-relief valve to fuel vapor extant in the fuel-tank filler neck and characterized by negative pressure in excess of a predetermined negative pressure, wherein the upper O-ring seal, the lower O-ring seal, and the side wall therebetween cooperate to form means for cooperating with the fuel-tank filler neck to form a sealed vapor-transfer chamber when the filler-neck closure is mounted on the fuel-tank filler neck, and the side wall of the closure body is formed to include a vent channel to conduct pressurized fuel vapor that has been admitted into the interior chamber through the vent aperture when the vacuum-relief valve is moved to the opened position into the sealed vapor-transfer chamber.

18. The fuel vapor transfer system of claim 17, further comprising a fuel-tank filler neck formed to include a vent port opening into the sealed vapor-transfer chamber to communicate with pressurized fuel vapor extant therein and a vapor conduit configured to conduct pressurized fuel vapor discharged from the sealed vapor-transfer chamber into the vent port to a vapor-recovery canister.

19. The fuel vapor transfer system of claim 18, wherein the fuel-tank filler neck includes a threaded section, the closure body includes a threaded section configured to mate with the threaded section of the filler neck to retain the filler-neck closure in a mounted position in the fuel-conducting passageway formed in the fuel-tank filler neck, and the threaded section of the closure body is formed to include a channel outlet opening into the vent channel and communicating with the sealed vapor-transfer chamber.

20. The fuel vapor transfer system of claim 18, wherein the fuel-tank filler neck is formed to include a filler-neck mouth opening into the fuel-conducting passageway and the vent port is arranged to lie in spaced-apart relation to the filler-neck mouth to locate the threaded section of the fuel-tank filler neck therebetween.

\* \* \* \* \*